United States Patent
Zhang et al.

(10) Patent No.: US 9,853,553 B2
(45) Date of Patent: Dec. 26, 2017

(54) INTERFACE CIRCUITS FOR USB AND LIGHTING APPLICATIONS

(71) Applicant: Infineon Technologies Austria AG, Villach (AT)

(72) Inventors: Di Zhang, Singapore (SG); Yaw Hann Thian, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 348 days.

(21) Appl. No.: 14/195,455

(22) Filed: Mar. 3, 2014

(65) Prior Publication Data
US 2015/0249393 A1    Sep. 3, 2015

(51) Int. Cl.
H02M 3/335    (2006.01)

(52) U.S. Cl.
CPC .............................. *H02M 3/33523* (2013.01)

(58) Field of Classification Search
CPC .......... H02M 3/22; H02M 3/28; H02M 3/325; H02M 3/335; H02M 3/33507; H02M 3/33523; H02M 3/33515; H02M 3/3353; H02M 3/33538; H02M 3/33546; H02M 3/33553; H02M 3/156; H02M 3/1566; H02M 3/157; H02M 3/158; H02M 2001/0006; H02M 2001/0025; Y02B 70/00; Y02B 70/10; Y02B 70/12; Y02B 70/14; Y02B 70/16; Y02B 70/1433; Y02B 70/1475
USPC .. 363/15–26, 40, 41, 65, 74, 78, 79, 80, 89, 363/95–99, 131–134, 146; 323/205–211, 323/222–226, 267, 271–275, 279, 323/282–287, 351, 902; 713/300–340; 710/305–317; 320/107–115
See application file for complete search history.

(56) References Cited

U.S. PATENT DOCUMENTS

| | | | |
|---|---|---|---|
| 6,906,932 B2 * | 6/2005 | Kung ................ | H02M 3/33515 323/283 |
| 7,672,146 B2 * | 3/2010 | Park .................. | H02M 3/33523 363/21.01 |
| 7,710,092 B2 * | 5/2010 | Chapuis ............... | H02M 3/157 323/282 |

(Continued)

FOREIGN PATENT DOCUMENTS

| | | |
|---|---|---|
| CN | 201699461 U | 1/2011 |
| CN | 202817867 U | 3/2013 |

OTHER PUBLICATIONS

"Design Guideline for Primary Side Regulated (PSR) Flyback Converter Using FAN103 and FSEZ13X7," Application Note AN-8033, Fairchild Semiconductor, Rev. 1.0.1, Nov. 16, 2011, pp. 1-16.

(Continued)

*Primary Examiner* — Timothy J Dole
*Assistant Examiner* — Carlos Rivera-Perez
(74) *Attorney, Agent, or Firm* — Slater Matsil, LLP

(57) ABSTRACT

In accordance with an embodiment of the present invention, a method of operating a power supply circuit includes receiving an input signal comprising a request for a target power supply voltage and/or current at an interface circuit at a secondary side of an adjustable power supply. The input signal is converted into a digital signal comprising the target power supply voltage and/or current. The digital signal is transmitted via a galvanically isolated signal path to a controller in a primary side of the adjustable power supply.

27 Claims, 10 Drawing Sheets

(56) References Cited

U.S. PATENT DOCUMENTS

2012/0166700 A1* 6/2012 Wright ............. H03K 19/00369 710/308
2013/0121031 A1* 5/2013 Sims ....................... H02M 1/44 363/15
2014/0136863 A1* 5/2014 Fritchman ................. G06F 1/26 713/310

OTHER PUBLICATIONS

Chen, S., et al., Implementation of the primary-side regulation in flyback converters (Part1 of 2), EE Times, http://www.eetimes.com/documents.asp?doc_id=1278790&print=yes, May 23, 2011, pp. 1-7.

Chen, S., et al., Implementation of the primary-side regulation in flyback converters (Part 2 of 2), EE Times, http://www.eetimes.com/documents.asp?doc_id=1278790&print=yes, May 30, 2011, pp. 1-6.

Choi, H., "Primary Side Regulation Technology for Low Cost and High Efficiency Offline LED Driver," Fairchild Semiconductor, received Feb. 17, 2014, 6 pages.

Applications Engineering Department, "24 W HVDCP Quick Charge 2.0 Compatible High Efficiency CV/CC Adaptor Using TOPSwitch™_ JX TOP268VG and ChiPhy™ CHY100D," Power Integrations, Design Example Report, Revision 1.0, Oct. 8, 2013, 72 pages.

Dunstan, B., et al., "Universal Serial Bus Power Delivery Specification," Revision 1.0, Including Errata through Jun. 26, 2013 (Version 1.2), 328 pages.

Picard, J., "Under the Hood of Flyback SMPS Designs," 2010 Texas Instruments Power Supply Design Seminar, SEM1900, Topic 1, TI Literature No. SLUP261, 2010, 2011, pp. 1-44.

Lai, M., et al., "Battery Charging Specification," Revision 1.2, Dec. 7, 2010, 71 pages.

"Charger Physical Interface IC for Quick Charge 2.0," Power Integrations, ChiPhy, Power Integrations, http://www.powerint.com/en/products/chiphy-family/chiphy, Feb. 6, 2014, pp. 1-2.

Taranovich, S., "Power Integrations teams with Qualcomm on rapid-charging technology for mobile devices," http://www.edn.com/electronics-products/electronic-product-reviews/otehr/4419158/Pow..., Nov. 12, 2013, pp. 1-5.

"USB Power Delivery Specification 1.0," USB Delivery—1.0 Introduction, Jul. 16, 2012, 11 pages.

Vu, T. T., et al., "Primary-side sensing for a flyback converter in both continuous and discontinuos conduction mode," ISSC 2012, NUI Maynooth, Jun. 28-29, 2012, 6 pages.

* cited by examiner

| D+ | D- | Output Voltage |
|---|---|---|
| 0.6 | 0.6 | 12 |
| 3.3 | 0.6 | 9 |
| 3.3 | 3.3 | 20 |
| 0.6 | 0 | 5 |

INTERFACE CIRCUITS FOR USB AND LIGHTING APPLICATIONS

TECHNICAL FIELD

The present invention relates generally to interface circuits, and, in particular embodiments, to interface circuits for USB and lighting applications.

BACKGROUND

Portable electronic devices, such as smartphones and tablets, are consuming more power as they become more computationally powerful and complex. The energy storage capacity of the batteries used to power such devices is also correspondingly increasing to accommodate the increased power demands.

In many portable products, the Universal Serial Bus (USB) is often used both as communication port and as a power delivery port to accommodate battery charging. For example, a standard USB 2.0 compliant port may provide a maximum power delivery of 7.5 W (5V at 1.5 A) to a dedicated charging port that may be used to recharge the battery of a portable device. However, as the battery capacities of portable devices are increasing, for example, from 5600 mAh to 8000 mAh and 10000 mAh, the charging time for these devices increase accordingly. For example, using a standard USB 2.0 compliant port, it takes about 2 hours and 40 minutes to recharge a 5600 mAh battery, but it takes 4 hours and 45 minutes to recharge a 10000 mAh.

By increasing the charging current or charging voltage, however, faster charging times may be achieved. In some cases, a "Y" connector may be used to combine the output of two USB ports to provide higher currents, or some non-standard USB-type implementations may allow for higher currents.

SUMMARY OF THE INVENTION

In accordance with an embodiment of the present invention, a method of operating a power supply circuit comprises receiving an input signal comprising a request for a target power supply voltage and/or current at an interface circuit at a secondary side of an adjustable power supply. The input signal is converted into a digital signal comprising the target power supply voltage and/or current. The digital signal is transmitted via a galvanically isolated signal path to a controller in a primary side of the adjustable power supply.

In accordance with an alternative embodiment of the present invention, an interface circuit comprises a receiver circuit, a converter circuit, and a transmitter circuit. The receiver circuit is configured to receive an input signal at a secondary side of an adjustable power supply. The input signal comprises a request for a target power supply voltage and/or current. The converter circuit is configured to convert the input signal into a digital signal comprising the target power supply voltage and/or current. The transmitter circuit is configured to be coupled to, but galvanically isolated from, a controller in a primary side of the adjustable power supply and configured to output the digital signal to the controller.

In accordance with an embodiment of the present invention, a power supply circuit comprises an adjustable power supply comprising a primary side winding and a secondary side winding and an interface circuit coupled to the secondary side winding. The interface circuit comprises a receiver circuit, a converter circuit, and a transmitter circuit. The receiver circuit is configured to receive an input signal at the secondary side, the input signal comprising a request for a target power supply voltage and/or current. The converter circuit is configured to convert the input signal into a digital signal comprising the target power supply voltage and/or current. The transmitter circuit is configured to output the digital signal. An optical or inductive coupler is coupled to the interface circuit. A primary side circuit is coupled to the primary side winding of the adjustable power supply. The primary side circuit is configured to regulate the output of the adjustable power supply. The primary side circuit comprises a controller coupled to the optical or inductive coupler. The controller is configured to receive the digital signal from the interface circuit through the optical or inductive coupler, and adjust the adjustable power supply to provide the requested target power supply voltage and/or current.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2B illustrate operations at a power provider and a power consumer device;

FIGS. 6A and 6B illustrate a detailed schematic of a power provider/lighting circuit in accordance of one embodiment of the present invention, wherein FIG. 6A illustrates the circuit and FIG. 6B illustrates the controller;

DETAILED DESCRIPTION OF ILLUSTRATIVE EMBODIMENTS

Figure 1:
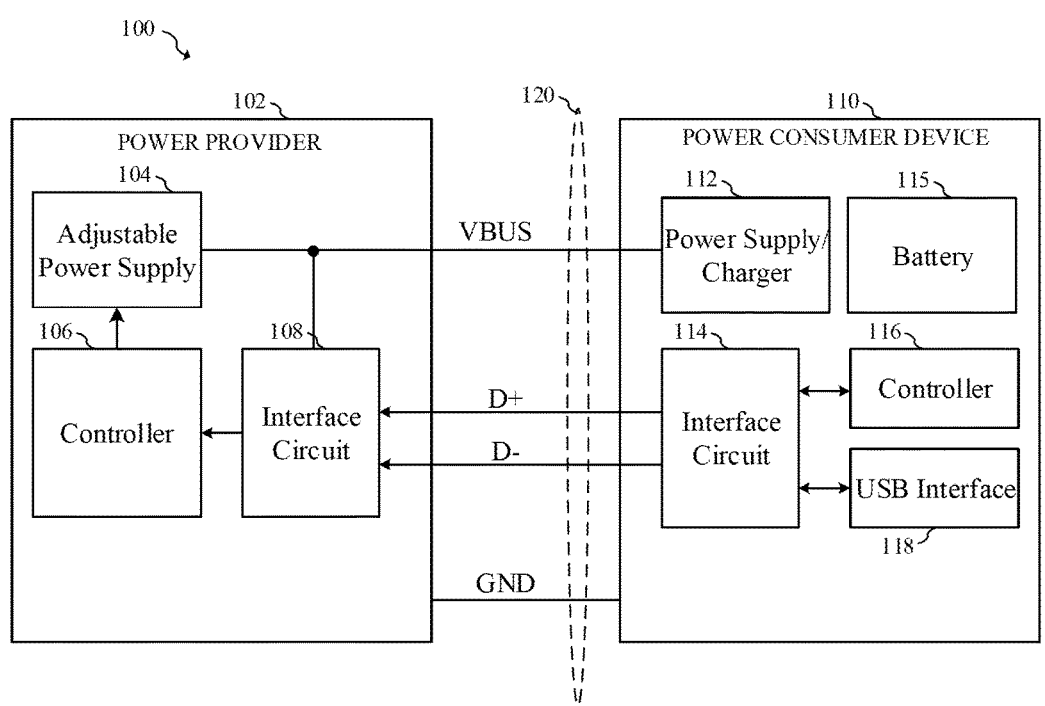
FIG. 1 illustrates a power system according to an embodiment of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for an interface that may be used for communication between a charging port and a portable device or a lighting controller and a lighting device. The invention may also be applied to other systems and applications including other circuits that perform serial communication and/or provide power to electronic devices.

Flyback converters are commonly used in power supplies in consumer electronics and lighting applications such as light emitting diode drivers. Flyback converters typically implement a secondary feedback using phototransistors and error amplifiers in the secondary side circuit to output a constant voltage and/or constant current. In such usage, the secondary side circuit transfers the secondary side pulse signal to the primary side for the feedback loop to modulate the pulse duty-cycle applied to the switch transistor coupled to the primary winding. However, such secondary feedback loops run into difficulties in applications requiring multiple output voltages and currents from the flyback converters.

One such application relates to USB fast or quick charging that require multiple output voltages, e.g., 5 V, 9 V, 12 V, or 20 V. A conventional way to change the output voltage of the switching mode power supply (SMPS) in constant voltage mode is to change the resistor divider ratio of the feedback network for each requested output voltage. In such conventional circuits, for example, ChiPhy™ Family IC, senses the requested voltage signal, for example, the D+ and D− signal line of a USB bus, and accordingly changes the ratio of the resistor divider of the feedback network of the SMPS so that the output voltage VOUT changes accordingly.

In an embodiment of the present invention, a power delivery system includes a dedicated charging port that is configured to provide power to a device connected via a USB cable. After a detection operation, the charging system communicates with the connected device. During this communication, various parameters may be exchanged between the charger and the connected device on at least one of the D+ and D− lines of the USB cable by using dedicated voltage levels. For example, the connected device may indicate a requested charging voltage for the dedicated charging port to provide to the connected device. In such a case, using embodiments of the present invention further described below, the dedicated charging port may adjust an output voltage of a power supply circuit that provides charge to the connected device.

In another embodiment, the connected device may indicate a requested constant current for used in an application, for example, a lighting application whose output depends on the input current. In such a case, using embodiments of the present invention further described below, the lighting controller may adjust an output current of a power supply circuit that provides current to the connected light source.

FIG. 1 illustrates a power system 100 according to an embodiment of the present invention. The power system 100 includes a power provider 102 that is coupled to a power consumer device 110 via a bus connection 120. The bus connection 120 may adhere to various standard protocols. In one embodiment, the bus connection 120 is a universal serial bus (USB). In alternative embodiments, the bus connection 120 may comprise other standards such as Lightning™, IEEE 1394 (FireWire), IEEE 802.3af Power over Ethernet, and others.

It should be understood that in some embodiments, the power consumer device 110 may represent any device that is coupled to the power provider 102 via a cable such as a USB cable. As shown, the bus connection 120 includes signal lines, namely, power supply connection VBUS, the ground connection GND, and data lines D+ and D−. In alternative embodiments, other power and data connections may be used instead of bus connection 120.

The power provider 102 includes an adjustable power supply 104 that provides power to the power supply connection VBUS. In various embodiments, the adjustable power supply 104 may comprise a switched mode power supply (SMPS). In one or more embodiments, the adjustable power supply 104 comprises a transformer-isolated converter such as a flyback converter.

In embodiments of the present invention, the amount of power provided to the power consumer device 110 may be adjusted by changing the output voltage of the adjustable power supply 104. For example, the voltage of the power supply connection VBUS may be adjusted between about 5 V and about 20 V in various numbers of steps. Alternatively, voltages outside of this range may be used depending on the particular device and its specifications. For example, the USB cable may allow up to 100 W of power consumption, which may be provided, for example, at 5 V or at 20 V.

The power provider 102 also includes an interface circuit 108 coupled to data lines D+ and D−. In an embodiment, the interface circuit 108 includes a transmitter and receiver configured to engage in communication between the power provider 102 and the power consumer device 110. In one embodiment, this communication between the power provider 102 and power consumer device 110 is one-sided, i.e., from the power consumer device 110 to the power provider 102. However, in alternative embodiments, the communication may also be two-sided, for example, duplex or half-duplex. The controller 106 receives the communication from the interface circuit 108 and controls the adjustable power supply 104. In particular, the controller 106 is configured to regulate the output voltage. However, the interface circuit 108 is only optically coupled to the controller 106 with no other electrical coupling. In some cases, the interface circuit 108 is only inductively coupled to the controller 106 with no other electrical coupling. For example, the interface circuit 108 may be coupled to the controller 106 through an optical coupler comprising a light emitting diode and a phototransistor. This results in a change in the output voltage at the power supply connection VBUS. Thus, embodiments of the present invention enable primary side regulation.

In various embodiments, the power consumer device 110 consumes power delivered by the power provider 102. The power consumer device 110 includes a power supply/charger 112 that receives power from the adjustable power supply 104 within the power provider 102.

Depending on the particular implementation of the power consumer device 110, the power supply/charger 112 may operate at various voltages of the power supply connection VBUS. For example, during a normal operation mode, the power supply/charger 112 may provide sufficient power to the power consumer device 110 when the power supply connection VBUS is set to about 5 V. On the other hand, during a charging operation, or during a fast charging operation, the power supply/charger 112 may be able to more quickly charge a battery 115 coupled to the power consumer device 110 when the power supply connection VBUS is set to a higher voltage, such as 12 V or 20 V.

In an embodiment, the power consumer device 110 may signal the power provider 102 for a requested power supply voltage at the power supply connection VBUS. This signaling, for example, may occur via the interface circuit 114 that includes a transmitter and a receiver capable of communication with the power provider 102, and provides a way for the power consumer device 110 to indicate to the power provider 102 that the power consumer device 110 is able to operate at a higher voltage than the standard 5 V USB power voltage.

The controller 116 operates the interface circuit 114, and the USB interface 118 is coupled to data pins D+ and D− via the interface circuit 114. In one or more embodiments, communication between the power provider 102 and the power consumer device 110 is performed using high speed circuitry of a standard USB interface. Alternatively, in some embodiments, the communication between the power provider 102 and the power consumer device 110 may be performed separately or using standard circuitry of the appropriate standard of the power consumer device 110.

In various implementations, the power provider 102 and the power consumer device 110 may be implemented in many different ways. The power provider 102 and the power consumer device 110 may have many different configurations, e.g., USB or non-USB communication, single versus multiple ports, dedicated power supplies versus supplies shared on multiple ports, hardware versus software based implementations, for example. The architecture in FIG. 1 is provided to illustrate the high level components in one possible implementation.

As illustrated in FIG. 1, the bus connection 120 connects the power provider 102 to the power consumer device 110. In USB power delivery, pairs of directly attached ports negotiate voltage, current and/or direction of power flow over the power supply conductor VBUS. In particular, using the data lines D+ and D−, the power consumer device 110 communicates to the power provider 102, a voltage at the power supply connection VBUS. In response, the power provider 102 provides the requested voltage to the power consumer device 110 through the power supply connection VBUS.

Figures 2A, 2B:
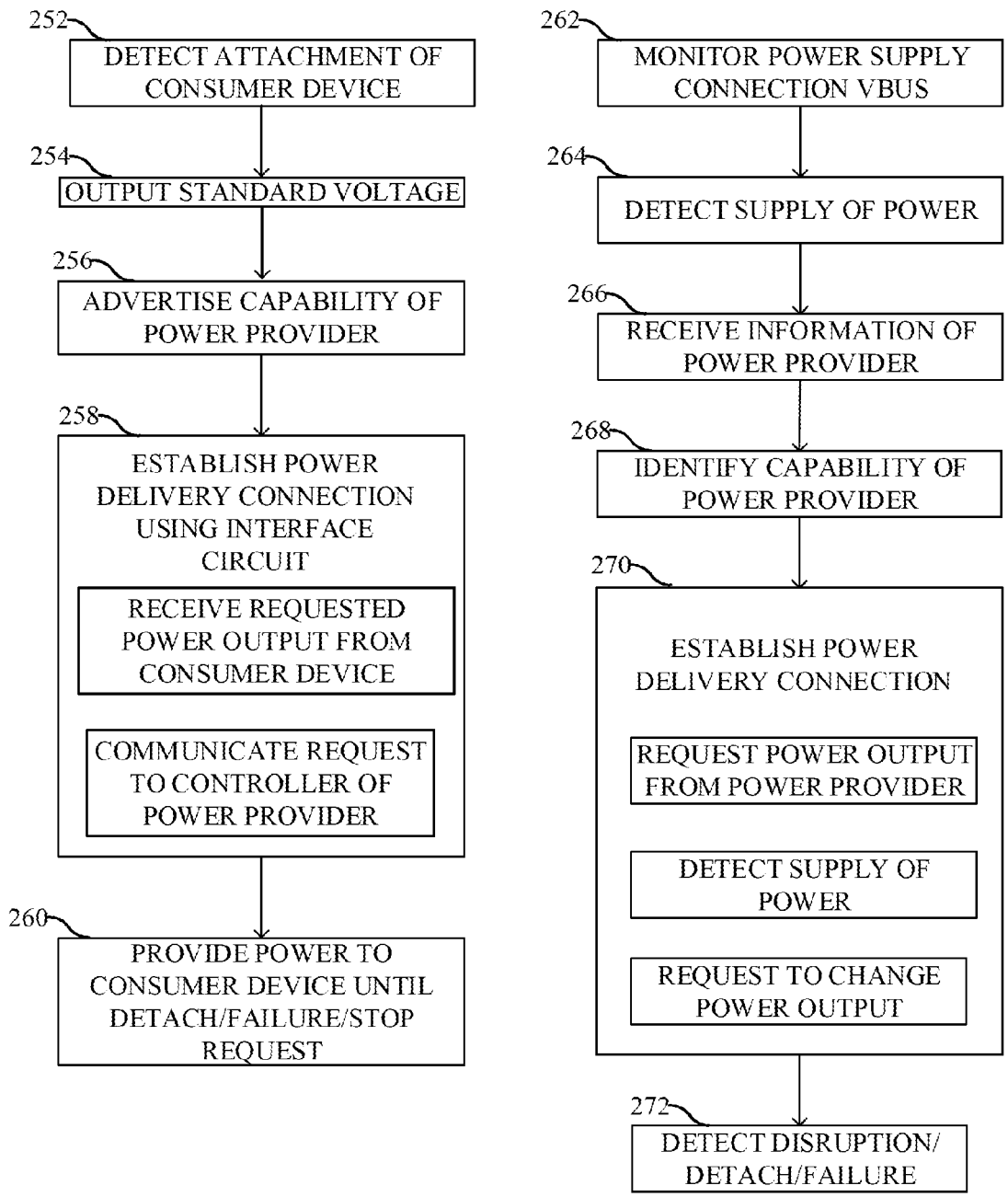
FIGS. 2A-2B illustrate the operations of the power delivery system in accordance with embodiments of the present invention.

FIGS. 2A-2B illustrate the operations of the power delivery system in accordance with embodiments of the present invention. FIGS. 2A and 2B illustrate operations at the power provider 102 and the power consumer device 110 illustrated in FIG. 1.

Referring to FIG. 2A, the power provider 102 detects the attachment of the power consumer device 110 after the two devices are physically attached and an electrical connection is securely made (box 252).

When the power provider 102 and the power consumer device 110 are attached to each other, the downstream and upstream ports initially default to standard USB operation (box 254). Therefore, the output on the power supply connection VBUS defaults to 5 V (or 0 V) and the power consumer device 110 draws current in accordance with the USB standards.

Meanwhile, the power consumer device 110 is monitoring the output at the power supply connection VBUS (box 262 of FIG. 2B). When the power provider 102 outputs the standard voltage at the power supply connection VBUS, the power consumer device 110 detects an output power (box 264 of FIG. 2B).

Referring to box 256 of FIG. 2A, the power provider 102 may communicate with the power consumer device 110, for example, through the interface circuit 108. For example, the interface circuit 108 may indicate a capability of the power provider 102 to the power consumer device 110.

Referring to box 266 of FIG. 2B, the power consumer device 110 may receive the communication, which may be an advertisement, from the power consumer device 110. Based on this advertisement, the power consumer device 110 identifies the capabilities of the power provider 102, for example, and then associate the power provider 102 with a particular charger profile (box 268 of FIG. 2B). For example, the power consumer device 110 may identify that the power provider 102 is capable of fast charging at multiple voltages/currents. Further, the power consumer device 110 may identify that the output of the power supply connection VBUS may be changed during the charging process.

Next, the power consumer device 110 negotiates the power delivery requirement with the power provider 102. As next illustrated in box 258 of FIG. 2A and box 270 of FIG. 2B, a power delivery connection is established. The power delivery connection is made through the interface circuit 108, which will be described in more detail in various embodiments. For example, the power consumer device 110 requests a particular power output, which is received at the power provider's interface circuit 108. The requested power output may be a constant voltage and/or current.

In particular, the interface circuit 108 of the power provider 102 takes the requested power output values from the power consumer device 110 and provides it to the controller 106 without changing the feedback network. In particular, the interface circuit 108 is only optically coupled to the controller 106. After power delivery has been negotiated, power can be supplied at higher or lower voltages and/or currents than the standard default voltage. The output of the power supply connection VBUS may be modified during the charging process as the power consumer device 110 requests a change in power output, for example, as the battery nears complete charging.

Additionally, the power connection may be further modified during the power delivery connection if the power provider 102 detects that the bus connection 120 and/or power consumer device 110 has a higher capability than was previously advertised. In such a case, the power delivery capability may be readvertised and a better power delivery connection may be established.

The power provider may stop supplying power if it identifies a detachment by the consumer device, a failure, and/or a stop request is received (box 260). Similarly, the consumer device is configured to detect if there is a disruption in power supply, a detachment, or any other failure (box 272).

Figure 3:
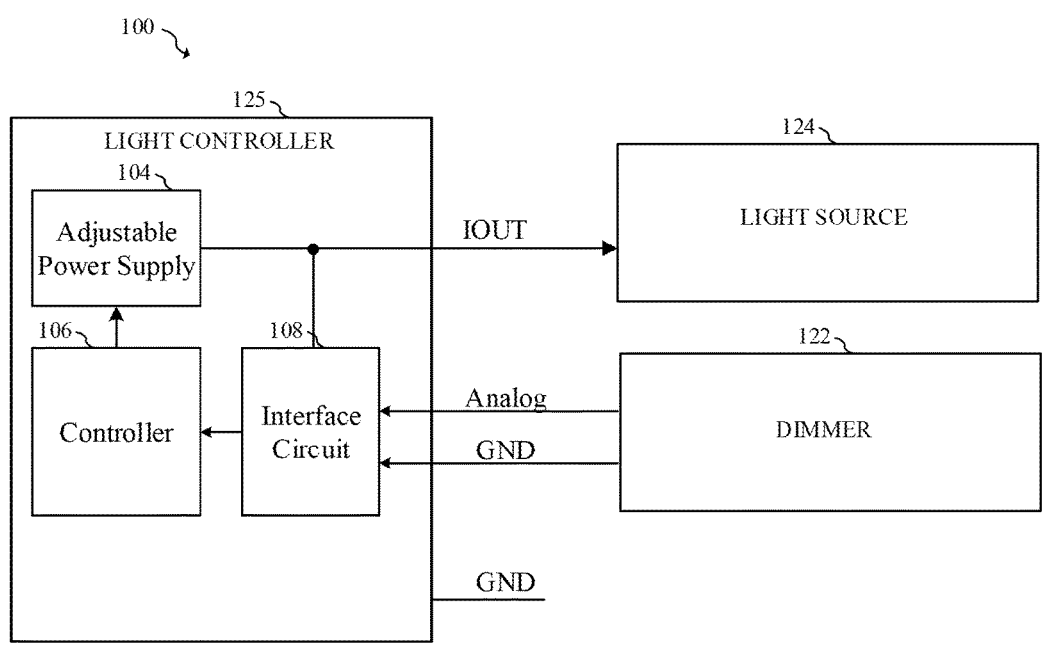
FIG. 3 illustrates an alternative embodiment application of a power system used as a lighting controller in accordance with an embodiment of the present invention.

FIG. 3 illustrates an alternative embodiment application of a power system 100 according to an embodiment of the present invention. The power system 100 includes a power provider (light controller 125) that is coupled to a dimmer 122 and a light source 124. The dimmer 122 may be an analog dimmer for controlling the intensity of light output from the light source 124. By decreasing or increasing the DC voltage, the dimmer 122 controls the mean power to the light source 124. In various embodiments, the light source 124 may be a light emitting diode (LED) light. However, in other embodiments, the light source 124 may be other types of diodes such as incandescent, halogen, and compact fluorescent light sources.

In one or more embodiments, LEDs are used as the light source 124. In such embodiments, the input current to the LEDs is controlled rather than the input voltage. This is because luminous output from a LED light source is roughly proportional to the amount of current supplied to the LED. The greater the current, the higher the intensity as long as the applied current is within the design/breakdown limits of the device.

A dimmer 122 typically outputs an analog voltage in steps, for example, between 0 V to 10 V. The input to a typical LED is a fixed current value. Therefore, the analog voltage has to be converted to a current before supplying to the LED.

Accordingly, in various embodiments, the power system 100 generates a constant output current TOUT based on the output from the dimmer 122. In various embodiments, the analog output from the dimmer 122 is received and processed at the interface circuit 108, which converts the analog voltage to a digital signal comprising a value indicating a constant current TOUT expected at the output of the light controller 125. This digital signal is communicated to the controller 106, which then controls the adjustable power supply to provide a constant current TOUT. Alternatively, a digital value of the analog voltage may be provided to the light controller 125.

In various embodiments, the light controller 125 of FIG. 3 and the power provider 102 of FIG. 1 use the same components. For example, the interface circuit 108 is common to both the light controller 125 and the power provider 102.

Figure 4:
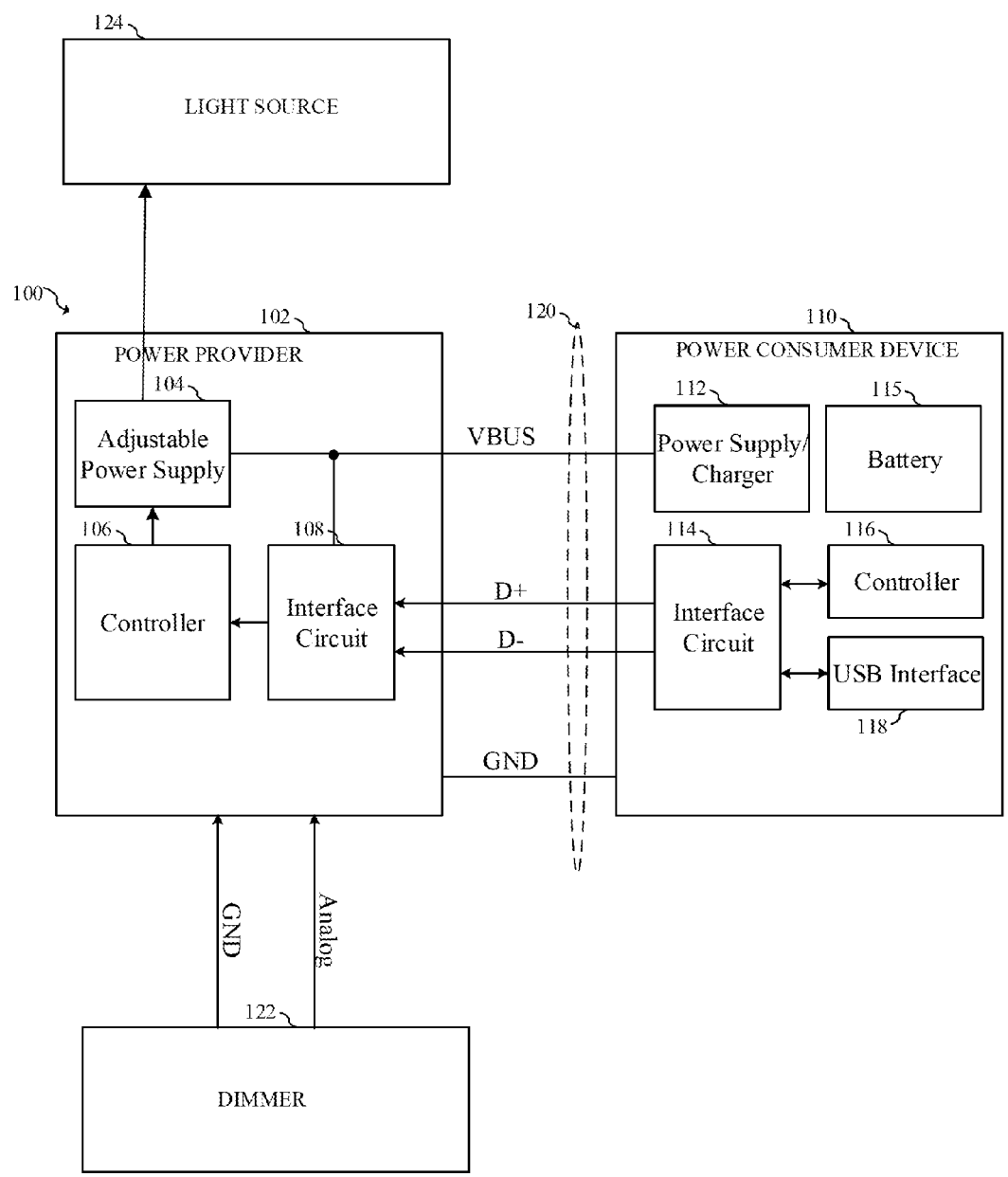
FIG. 4 illustrates a power charger and light controller integrated into a single power provider device and using a common interface circuit in accordance with an embodiment of the present invention.

FIG. 4 illustrates a power provider and light controller integrated into a single device and using a common interface circuit in accordance with an embodiment of the present invention.

The power provider 102 may provide an output voltage on a bus connection 120 as described in FIG. 1 or may provide a constant current output as described in FIG. 3. The power provider 102 may perform these operations sequentially or in parallel. If the operations of the lighting controller and battery charging are performed in parallel, then the power provider 102 may include multiple power supply units, for example, more than one flyback converters.

Figure 5:
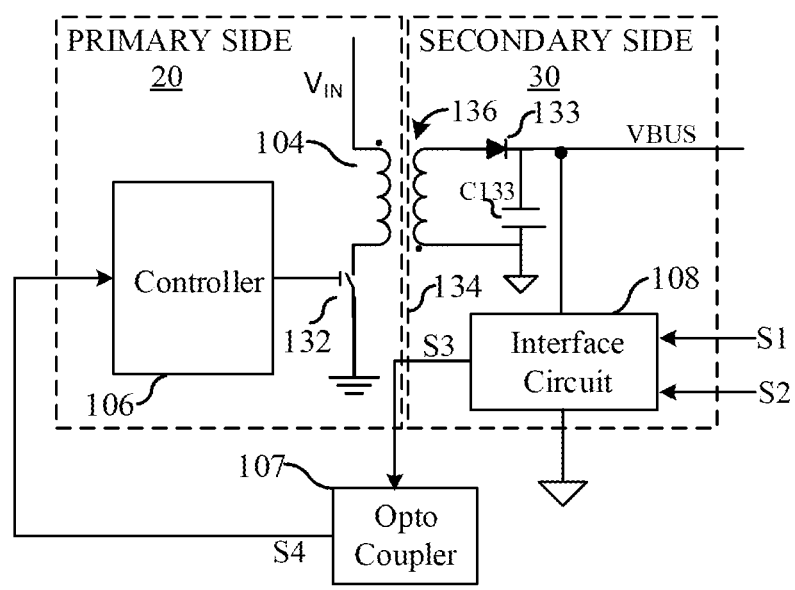
FIG. 5 illustrates a schematic of an embodiment of power provider/lighting controller circuit.

FIG. 5 illustrates a schematic of an embodiment of power provider/lighting controller circuit.

Referring to FIG. 5, the primary side 20 and secondary side 30 circuits are illustrated. The primary side 20 and secondary side 30 are galvanically isolated by isolation 134. The adjustable power supply 104 includes a switch 132, a diode 133, capacitor C133, and a flyback transformer 136. The switch 132 may be field effect transistor in various embodiments.

The adjustable power supply 104 operates by first storing energy from an input source into the flyback transformer 136 while the primary power switch 132 is on. When the switch 132 turns off, the transformer 136 voltage reverses, thereby forward-biasing the output diode 133 and delivering energy to the output. The adjustable power supply 104 is able to generate multiple output levels because of its ability to store different amounts of energy in the flyback transformer 136 before transferring to the output circuit. Thus, the controller 106 drives the switch 132 to generate multiple output levels from the adjustable power supply 104.

In various embodiments, the interface circuit 108 obtains a first signal S1 and a second signal S2 and generates a digital signal S3. In one embodiment, the first signal S1 and the second signal S2 are signals from the data lines D+ and D− of a USB bus, which may be differential data signals. In another alternative embodiment, the first signal S1 and the second signal S2 are signals from an analog dimmer.

The interface circuit 108 is part of the secondary side 30 in that it is coupled to the controller 106 only through an optical coupler 107. In one or more embodiments, the digital signal S3 is a digital signal, which may be a serial digital signal, for example, a universal asynchronous receiver/transmitter (UART) signal. In alternative embodiments, any other suitable digital signal may be used.

The digital signal S3 is transferred optically across the boundary between the primary side 20 and the secondary side 30 and a primary side digital signal S4 is provided to the controller 106. The controller 106 uses the information in the primary side digital signal S4 to modulate the switch 132, which changes the output of the adjustable power supply 104.

Figure 6A:
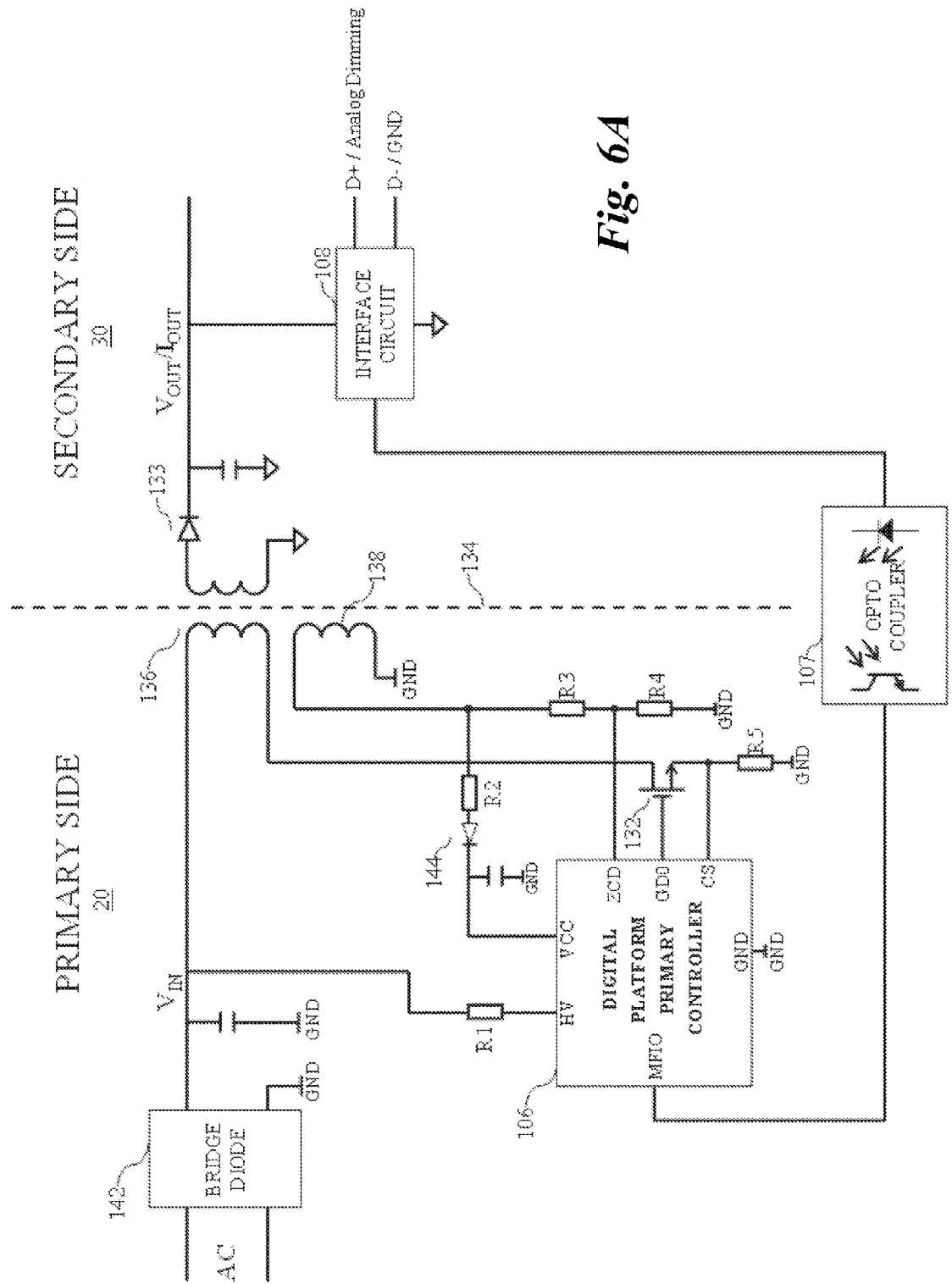
Figure 6B:
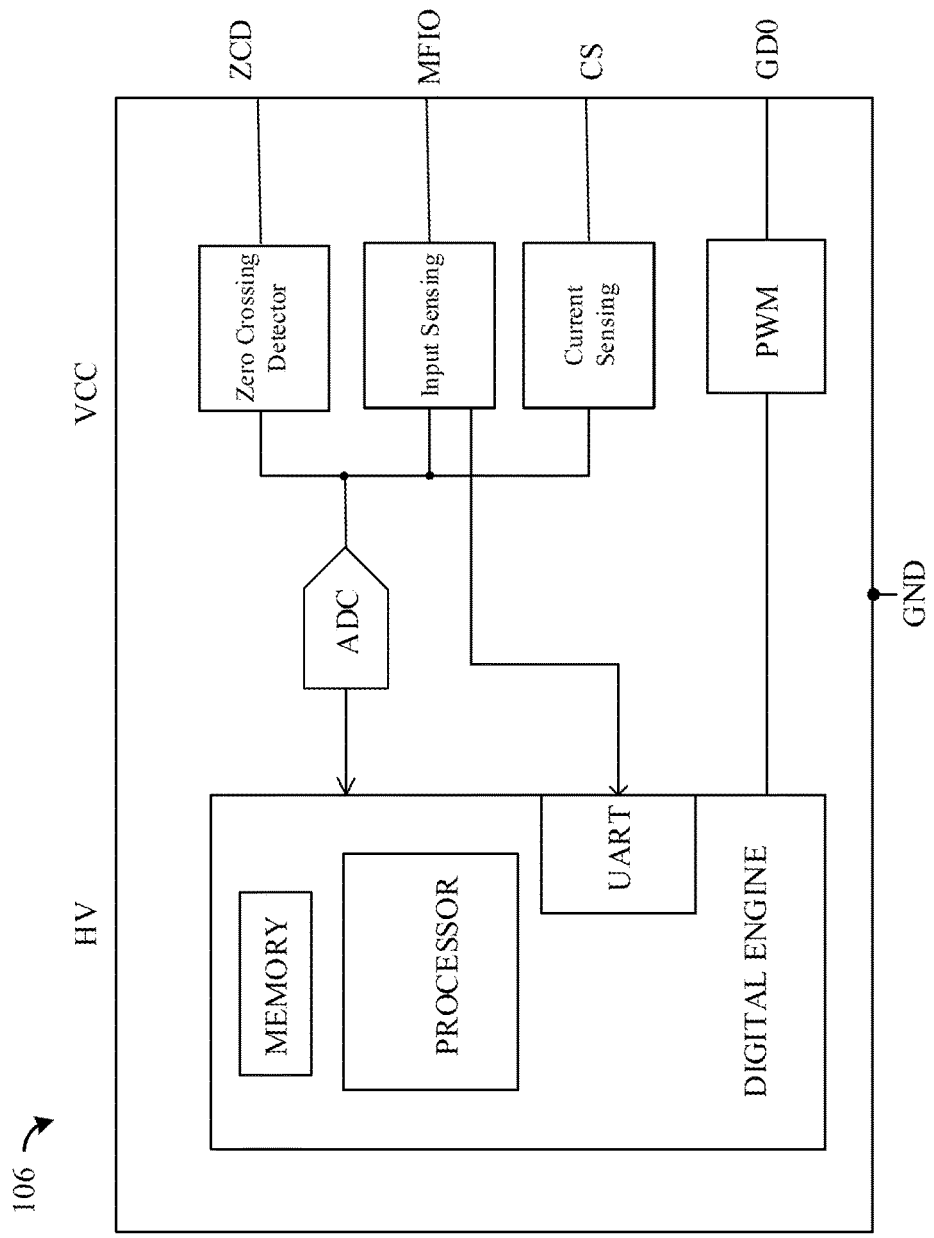

FIGS. 6A and 6B illustrate a detailed schematic of a power provider/lighting circuit in accordance of one embodiment of the present invention. FIG. 6A illustrates the circuit and FIG. 6B illustrates the controller.

Referring to FIG. 6A, the input AC voltage is converted through a bridge diode or rectifier into a DC supply voltage $V_{IN}$, which is provided to the high side of the primary winding of the flyback transformer 136. The transformer 136 includes a primary winding on the primary side 20 and a secondary winding on the secondary side 30, which are separated by the isolation 134. Additionally, the transformer 136 may include an auxiliary winding 138.

The supply voltage $V_{IN}$ is also provided to the controller 106 into the high side voltage (HV) pin. The controller 106 further includes a constant current supply voltage pin VCC, which is coupled to the auxiliary winding 138 through a blocking diode 144 and a resistor R2.

Referring to FIG. 6B, the controller 106 includes a digital engine, which among other things may include a memory and a processor. In some embodiments, the components of the controller 106 may be integrated at different levels, for example, on a same board, different board, same package, different package, same chip, different chips, and others. For example, in one case, the A/D Converter may be integrated with the digital engine on a single chip. In another example, the processor and the memory may be integrated on a single chip.

Referring to FIGS. 6A and 6B, the controller 106 includes a multiple function input output (MFIO) pin capable of receiving command signal from the interface circuit 108. The MFIO pin can be configured to sense the input for an A/D converter, e.g., an 8-bit A/D converter, and/or sense the input for the UART of a digital engine (FIG. 6B).

In various embodiments, the interface circuit 108 bridges the communication between the devices: USB and LED lighting electronic control gear on the secondary side 30 and the switched mode power supply (SMPS) controller 106 on the primary side 20 to produce a desired output voltage (or current) level from the adjustable power supply 104. The primary controller 106 is configured to allow the devices to request the desired output voltage (or current) level from the adjustable power supply 104. The controller 106 is enabled to drive the switch 132 to produce the desired output. Thus, primary side regulation can be effectively achieved by using the controller 106 and the interface circuit 108 without changing the feedback network on the secondary side as in conventional circuits.

As described previously, the interface circuit 108 receives the input signal from a power consuming device and decodes the communication into a digital signal such as a UART signal. This UART signal is then transmitted to the controller 106 on the primary side through the opto-coupler 107. The MFIO pin at the controller 106 receives this digital signal and is passed on to a UART at the digital engine of the controller 106 (FIG. 6B). The digital signal may indicate the difference between the output voltage VOUT and the desired target voltage in one embodiment. The digital engine of the controller 106 uses the information in the digital signal to control the switch 132. For example, this may be accomplished through a pulse width modulation (PWM)

controller by applying a PWM signal to the gate of the switch 132 through the GD0 pin.

The controller 106 may include a current sensing (CS) pin coupled to the current path of the switch 132. The controller 106 may further include a zero crossing detection (ZCD) pin coupled to a zero crossing detector to detect the zero crossing of the input signal (FIG. 6B). The zero crossing detector of the controller 106 is coupled to the auxiliary winding 138. For example, the zero crossing detector identifies if the voltage across the auxiliary winding approaches zero so that the controller 106 is then configured to start the power cycle again through the PWM output coupled to the switch 132. Accordingly, the controller 106 directly uses the voltage signal that it receives from an auxiliary winding 138 on the transformer primary side 20 to modulate the pulse duty-cycle, so as to stabilize the output current and voltage.

Figure 7A:
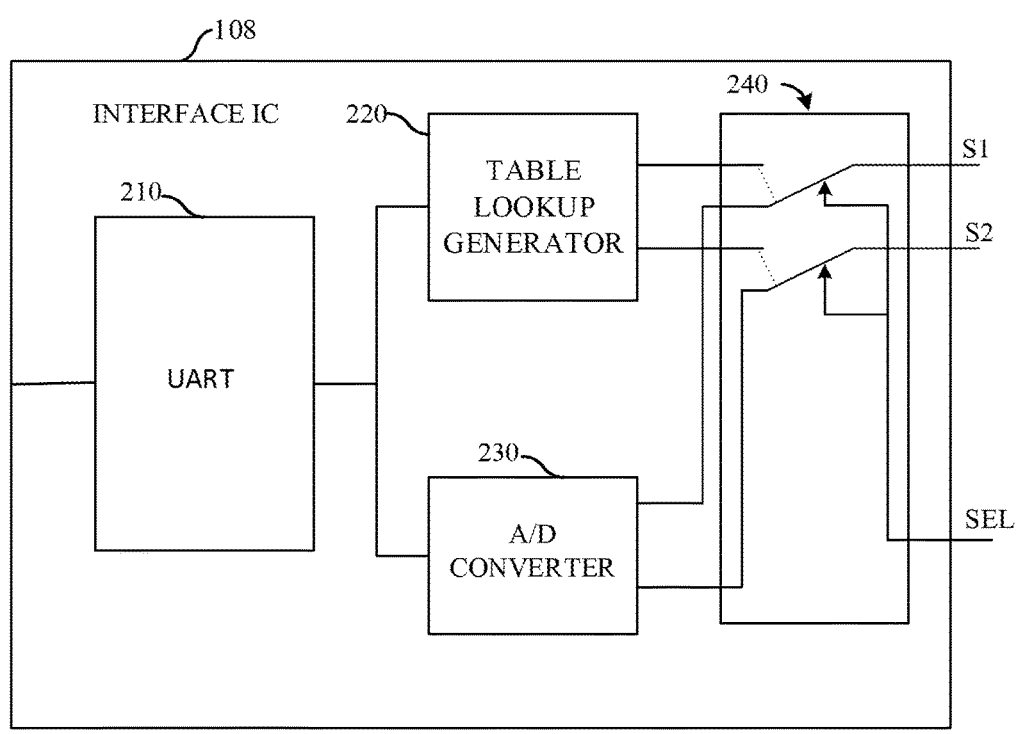
FIGS. 7A and 7B illustrate a detailed schematic of the interface circuit in accordance with embodiments of the present invention.
Figure 7B:
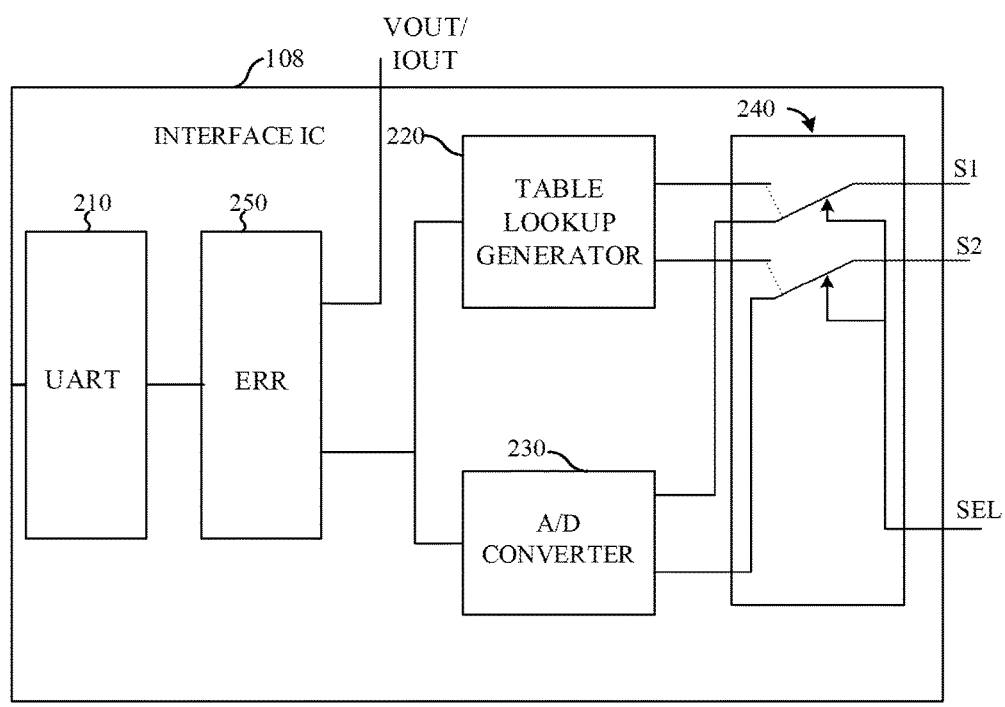

FIGS. 7A and 7B illustrate a detailed schematic of the interface circuit in accordance with embodiments of the present invention.

Referring to FIG. 7A, the interface circuit 108 includes a multifunctional switch 240 that is configured to route the input from the data lines S1 and S2 to either the table lookup generator 220 or to an A/D Converter (ADC) 230 depending on the value at the select line SEL. For example, if the data lines S1 and S2 are carrying information from a USB device in which the data lines D+ and D− are being asserted at the data lines S1 and S2 of the interface circuit 108, the signals are forwarded to the table lookup generator 220. The table lookup generator 220 may include a database or use an algorithm to determine a voltage value corresponding to the asserted signals on the data lines D+ and D−. An example of such a table is provided in FIG. 8.

Figures 8, 9:
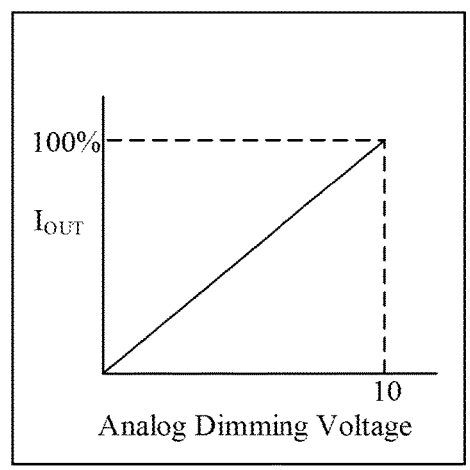
FIG. 8 illustrates an example of a table look up used by the table lookup generator of the interface circuit in accordance with an embodiment of the present invention.
FIG. 9 illustrates an example of a relationship between the output voltage of the analog dimmer and the output current of the adjustable power supply in accordance with an embodiment of the present invention.

FIG. 8 illustrates an example of a table look up used by the table lookup generator of the interface circuit in accordance with an embodiment of the present invention. For illustration, the table lookup generator 220 may determine that 0.6 V is asserted at both the D+ and D− lines. Accordingly, the table lookup generator 220 determines that the corresponding voltage value requested by the power consumer device is 12 V.

In contrast, if the data lines S1 and S2 are coupled to an analog dimmer as indicated by the SEL line, the input is forwarded to the ADC 230, which converts the analog voltage to a digital voltage. In some embodiments, the analog voltage may also be converted to an expected out current $I_{OUT}$ at the output of the adjustable power supply. An example of the relationship between the analog dimming voltage and the output current is illustrated in FIG. 9.

FIG. 9 illustrates an example of a relationship between the output voltage of the analog dimmer and the output current of the adjustable power supply in accordance with an embodiment of the present invention. The analog dimming voltage may vary from 0 V to 10 V while the output current is ramped up during this time from 0 A to 100% of the peak current.

The output from the table lookup generator 220 and the ADC 230 are sent to a UART 210, which generates a UART signal. The UART may also convert the output voltage VOUT or output current TOUT from the output of the adjustable power supply to a UART signal for providing a feedback to the controller 106.

In an alternative embodiment, illustrated in FIG. 7B, at an error detector 250, the output from the table lookup generator 220 and ADC 230 may be compared with the output voltage/current from the secondary winding to determine an error, for example, using an error amplifier. This error is then converted into a UART signal.

Accordingly, in various embodiments, advantageously, the output voltage or current is regulated without modifying the feedback network simply through primary side regulation. In contrast, conventional methods rely on changing the feedback network in the secondary side in order to change the output voltage of the SMPS. Further, embodiments of the invention can be applied to other applications that require multiple levels of constant current from the SMPS. For example, embodiments of the present invention may be seamlessly applied to constant voltage and/or constant current topology. Embodiments of the present invention reduce total costs because of the lower number of components used. For example, no resistor dividers are necessary unlike conventional circuits.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a power supply circuit, the method comprising:
    detecting an initial attachment of an external device to a bus connection of the power supply circuit;
    indicating, by an interface circuit, to the external device and as a direct result of the detecting the initial attachment, a capability of the power supply circuit, wherein the indicating the capability of the power supply circuit is unsolicited by the external device;
    receiving an input signal comprising a request for a target power supply voltage and/or current at the interface circuit at a secondary side of an adjustable power supply, wherein the request is based on the indicated capability of the power supply circuit;
    producing, based on the input signal, a digital signal comprising the target power supply voltage and/or current; and
    transmitting the digital signal via a galvanically isolated signal path to a controller in a primary side of the adjustable power supply.

2. The method of claim 1, wherein the controller is configured to adjust the adjustable power supply to provide the requested target power supply voltage and/or current.

3. The method of claim 1, wherein the digital signal is a universal asynchronous receiver/transmitter (UART) data signal.

4. The method of claim 1, wherein the input signal comprises differential data signals.

5. The method of claim 1, wherein the input signal comprises data signals from a Universal Serial Bus (USB) data line.

6. The method of claim 1, wherein the input signal comprises data signals from a Universal Serial Bus (USB) data line or an analog signal from a dimmer, wherein the digital signal is a universal asynchronous receiver/transmitter (UART) data signal.

7. The method of claim 1, wherein producing, based on the input signal, the digital signal comprises:
using a table look up generator to generate a requested output voltage; and
generating the digital signal comprising a universal asynchronous receiver/transmitter (UART) data signal from the requested output voltage.

8. The method of claim 1, wherein producing, based on the input signal, the digital signal comprises:
using an analog to digital converter to generate a second digital signal comprising the request for the target power supply voltage and/or current; and
generating the digital signal comprising a universal asynchronous receiver/transmitter (UART) data signal from the second digital signal comprising the request for the target power supply voltage and/or current.

9. The method of claim 1, wherein producing, based on the input signal, the digital signal comprises:
determining an error between the target power supply voltage and/or current and the actual output from the adjustable power supply; and
generating the digital signal comprising a UART data signal from the determined error.

10. The method of claim 1, wherein the method comprises performing only primary side regulation and not performing secondary side feedback control via the galvanically isolated signal path.

11. The method of claim 1, wherein the power supply circuit comprises a transformer comprising the primary side having a primary winding coupled to a power input from the power supply circuit and an auxiliary winding, and the secondary side having a secondary winding coupled to a power output from the power supply circuit, wherein the method further comprises: performing primary side regulation by modulating duty-cycle by using a voltage signal received from the auxiliary winding.

12. The method of claim 11, wherein a bias voltage for the controller is received from the auxiliary winding through a diode rectifier.

13. The method of claim 1, wherein producing, based on the input signal, the digital signal comprises:
receiving an actual output from the adjustable power supply; and
transmitting another digital signal via the galvanically isolated signal path to the controller in the primary side of the adjustable power supply.

14. The method of claim 1, further comprising supplying a standard operating voltage to the external device as a direct result of detecting the initial attachment and before receiving the input signal.

15. The method of claim 1, further comprising indicating a different capability of the power supply circuit as a result of the power supply circuit detecting that the bus connection or the external device has a different capability.

16. An interface circuit of a power supply circuit comprising:
a receiver circuit, the receiver circuit configured to receive an input signal at a secondary side of an adjustable power supply, the input signal comprising a request for a target power supply voltage and/or current;
a converter circuit configured to produce, based on the input signal, a digital signal comprising the target power supply voltage and/or current; and
a transmitter circuit configured to be coupled to, but galvanically isolated from, a controller in a primary side of the adjustable power supply and configured to output the digital signal to the controller, wherein the interface circuit is further configured to detect an initial attachment of an external device to a bus connection of the power supply circuit and, as a direct result of the detecting the initial attachment, indicate, to the external device, a capability of the power supply circuit, wherein the indicating the capability of the power supply circuit is unsolicited by the external device, and wherein the request received at the receiver circuit is based on the indicated capability of the power supply circuit.

17. The interface circuit of claim 16, wherein the controller is configured to adjust the adjustable power supply to provide the requested target power supply voltage and/or current.

18. The interface circuit of claim 16, wherein the digital signal is a universal asynchronous receiver/transmitter (UART) data signal.

19. The interface circuit of claim 16, wherein the input signal comprises differential data signals.

20. The interface circuit of claim 16, wherein the input signal comprises data signals from a Universal Serial Bus (USB) data line.

21. The interface circuit of claim 16, wherein the input signal comprises data signals from a Universal Serial Bus (USB) data line or an analog signal from a dimmer, wherein the digital signal is a universal asynchronous receiver/transmitter (UART) data signal.

22. The interface circuit of claim 16, wherein the converter circuit comprises:
a table look up generator configured to generate a requested output voltage; and
a universal asynchronous receiver/transmitter (UART) configured to generate the digital signal comprising a UART data signal from the requested output voltage.

23. The interface circuit of claim 16, wherein the converter circuit comprises:
an analog to digital converter configured to generate a second digital signal comprising the request for the target power supply voltage and/or current; and
a universal asynchronous receiver/transmitter (UART) configured to generate the digital signal comprising a UART data signal from the second digital signal comprising the request for the target power supply voltage and/or current.

24. The interface circuit of claim 16, wherein the converter circuit comprises:
an error amplifier configured to determine an error between the target power supply voltage and/or current and the actual output from the adjustable power supply; and
a universal asynchronous receiver/transmitter (UART) configured to generate the digital signal comprising a UART data signal from the determined error.

25. A power supply circuit comprising:
an adjustable power supply comprising a primary side winding and a secondary side winding;
an interface circuit coupled to the secondary side winding, the interface circuit comprising
a receiver circuit, the receiver circuit configured to receive an input signal at the secondary side, the input signal comprising a request for a target power supply voltage and/or current,
a converter circuit configured to convert the input signal into a digital signal comprising the target power supply voltage and/or current, and
a transmitter circuit configured to output the digital signal, wherein the interface circuit is further configured to detect an initial attachment of an external device to a bus connection of the power supply circuit and, as a direct result of the detecting the initial attachment, indicate, to the external device, a capability of the power supply circuit, wherein the indicating the capability of the power supply circuit is unsolicited by the external device, and wherein the request received at the receiver circuit is based on the indicated capability of the power supply circuit;

an optical or inductive coupler coupled to the interface circuit; and a primary side circuit coupled to the primary side winding of the adjustable power supply, the primary side circuit configured to regulate an output of the adjustable power supply, the primary side circuit comprising a controller coupled to the optical or inductive coupler, wherein the controller is configured to
  receive the digital signal from the interface circuit through the optical or inductive coupler, and
  adjust the adjustable power supply to provide the requested target power supply voltage and/or current.

26. The power supply circuit of claim 25, wherein the converter circuit comprises:
  a table look up generator configured to generate a requested output voltage;
  an analog to digital converter configured to generate a second digital signal comprising the request for the target power supply voltage and/or current; and
  a universal asynchronous receiver/transmitter (UART) configured to generate the digital signal comprising a UART data signal from the requested output voltage and the request for the target power supply voltage and/or current.

27. A method of operating a power supply circuit, the method comprising:
  detecting an initial attachment of an external device to a bus connection of the power supply circuit;
  supplying power at a default voltage at an output of an adjustable power supply;
  indicating, by an interface circuit, to the external device and as a direct result of the detecting the initial attachment, a capability of the power supply circuit, wherein the indicating the capability of the power supply circuit is unsolicited by the external device;
  at the interface circuit at a secondary side of the adjustable power supply, receiving an input signal comprising a request to supply power at a target current, wherein the request is based on the indicated capability of the power supply circuit;
  generating a digital signal comprising an indication of the target current;
  transmitting the digital signal via a galvanically isolated signal path to a controller in a primary side of the adjustable power supply; and
  supplying power at the target current at the output of the adjustable power supply.

* * * * *